United States Patent
Farahati et al.

(10) Patent No.: US 10,816,043 B2
(45) Date of Patent: Oct. 27, 2020

(54) METHOD OF FORMING WET FRICTION MATERIAL BY BURNING OFF FIBERS

(71) Applicant: Schaeffler Technologies AG & Co. KG, Herzogenaurach (DE)

(72) Inventors: Rashid Farahati, Copley, OH (US); Murat Bakan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 199 days.

(21) Appl. No.: 15/913,333

(22) Filed: Mar. 6, 2018

(65) Prior Publication Data

US 2019/0277345 A1    Sep. 12, 2019

(51) Int. Cl.
| F16D 13/64 | (2006.01) |
| B32B 38/00 | (2006.01) |
| B32B 37/12 | (2006.01) |
| B32B 7/12 | (2006.01) |
| B32B 5/26 | (2006.01) |
| F16D 13/60 | (2006.01) |

(52) U.S. Cl.
CPC ............... *F16D 13/64* (2013.01); *B32B 5/26* (2013.01); *B32B 7/12* (2013.01); *B32B 37/12* (2013.01); *B32B 38/004* (2013.01); *B32B 2262/0269* (2013.01); *B32B 2262/04* (2013.01); *B32B 2310/0463* (2013.01); *B32B 2315/16* (2013.01); *B32B 2605/00* (2013.01); *F16D 2300/10* (2013.01)

(58) Field of Classification Search
None
See application file for complete search history.

(56) References Cited

U.S. PATENT DOCUMENTS

| 5,585,166 A | 12/1996 | Kearsey |
| 6,182,804 B1 | 2/2001 | Lam |
| 9,499,759 B2 | 11/2016 | Kim et al. |
| 2006/0008635 A1 | 1/2006 | Dong et al. |
| 2017/0089415 A1 | 3/2017 | Kroll et al. |
| 2017/0261057 A1 | 9/2017 | Farahati et al. |
| 2017/0335913 A1 | 11/2017 | Farahati et al. |

FOREIGN PATENT DOCUMENTS

| JP | 07018091 A | 1/1995 |
| JP | 08121516 A | 5/1996 |
| JP | 2010083972 A | 4/2010 |

OTHER PUBLICATIONS

International Search Report and Written Opinion for corresponding PCT application.

*Primary Examiner* — Mark A Manley
(74) *Attorney, Agent, or Firm* — Davidson, Davidson & Kappel, LLC

(57) ABSTRACT

A method of making a wet friction material includes providing an outer layer on a base layer to form the wet friction material. The base layer includes a first proportion of fiber material and a first proportion of filler material. The outer layer includes a second proportion of fiber material and a second proportion of filler material. The second fiber proportion is less than the first fiber proportion and the second filler proportion is greater than the first filler proportion. The method further includes forming a modified outer layer by burning off the fiber material of the outer layer.

20 Claims, 2 Drawing Sheets

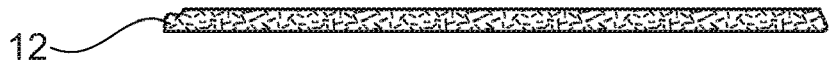
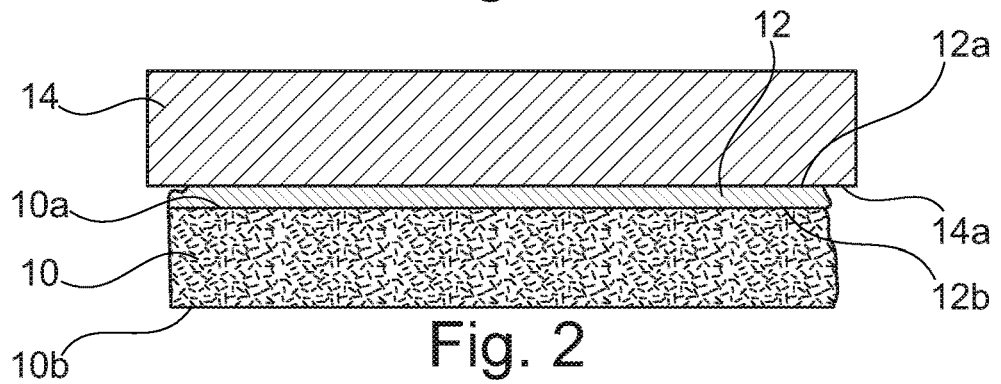
Fig. 1
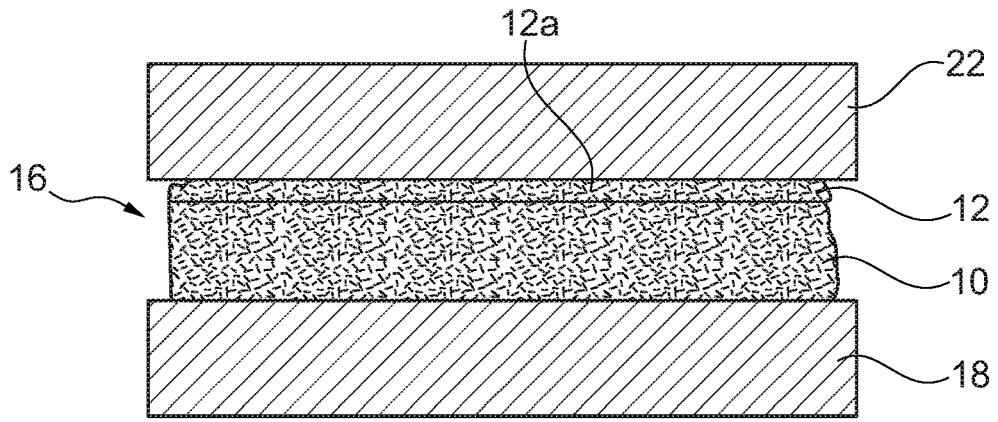
Fig. 2
Fig. 3
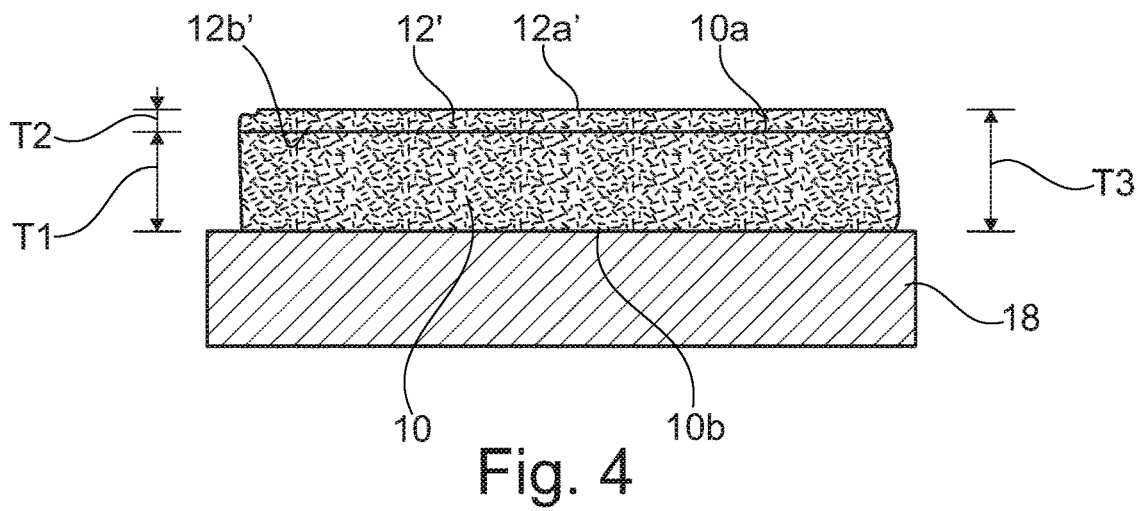
Fig. 4

METHOD OF FORMING WET FRICTION MATERIAL BY BURNING OFF FIBERS

The present disclosure relates generally to friction clutches and plates used in torque converters and motor vehicle transmissions and more specifically to wet friction material.

BACKGROUND

The friction material in wet-type friction clutches generally operates in an oil submerged environment and is often paper-based material used to form friction material rings.

U.S. Pub. 2017/0089415 discloses friction material including a bottom layer and a top layer forming a paper composite, with pores being created by a laser in the top surface.

U.S. Pub. 2017/0261057, U.S. Pub. 2006/0008635, U.S. Pub. 2017/0335913 and U.S. Pat. No. 9,499,759 disclose friction materials including two or more layers.

It is known to spray or sprinkle diatomaceous earth sold under the trade name CELITE on top of the base materials directly during the paper making process in a Fourdrinier machine at the wet end of the machine when the paper base material is being moved along a conveyor. This process is good for very high volume papers, but there is large waste during initial set up, so it is not practical for smaller volume production.

SUMMARY OF THE INVENTION

A method of making a wet friction material is provided. The method includes providing an outer layer on a base layer to form the wet friction material. The outer layer includes a first proportion of fiber material and a first proportion of filler material. The base layer includes a second proportion of fiber material and a second proportion of filler material. The second fiber proportion is greater than the first fiber proportion and the second filler proportion is less than the first filler proportion. The method further includes forming a modified outer layer by burning off the fiber material of the outer layer.

According to embodiments of the method, the base layer has a first thickness and the modified outer layer has a second thickness, the wet friction material has a total thickness equaling the first thickness plus the second thickness, and the second thickness may be 10% to 30% of the total thickness. The fiber material of the base layer may consist of synthetic fiber material. The fiber material of the outer layer may consist of cellulose fiber material. The first filler proportion and the second filler proportion may each formed by one or more fillers from a group consisting of diatomaceous earth and/or clay. The first fiber proportion may be between 35 to 60% of the base layer and the second fiber proportion is between of 5 to 25% of the outer layer. The forming of the modified outer layer may include exposing the outer layer to a temperature of from 850 to 950 degrees F. The forming of the modified outer layer may include applying a hot plate to an outer surface of the outer layer. The providing of the outer layer on the base layer to form the wet friction material may include laminating the outer layer on the base layer. At least one of the base layer and the outer layer may include a binder. The laminating of the outer layer on the base layer may include applying heat and pressure to the outer layer to fix the outer layer and the base layer together via the binder. The burning of the fiber material may create activated carbon in the outer layer.

A clutch assembly is also provided including a metal part and the wet friction material fixed on the metal part.

A wet friction material is also provided. The wet friction material includes a base layer; and an outer layer on the base layer. The base layer includes a fiber material and a first filler material. The outer layer includes a second filler material and burnt cellulose fibers including activated carbon. The outer layer includes pores passing through the outer layer.

According to embodiments of the wet friction material, the fiber material may consist of synthetic fiber material. The synthetic fibers may be aramid fibers. The base layer has a first thickness and the outer layer has a second thickness, the wet friction material has a total thickness equaling the first thickness plus the second thickness and the second thickness may be 10% to 30% of the total thickness. The outer layer may include a matrix of a second filler material defining a plurality of meandering pores passing through the outer layer. The second filler material may be from a group consisting of diatomaceous earth and/or clay. The first fiber proportion may be between 35 to 60% of the base layer.

BRIEF DESCRIPTION OF THE DRAWINGS

The present disclosure is described below by reference to the following drawings, in which:

FIG. 1 shows a base layer and an outer layer for forming the wet friction material in accordance with one embodiment of the present disclosure;

FIG. 2 shows the outer layer being laminated to the base layer;

FIG. 3 shows a wet friction material formed by the joining of the base layer and outer layer as described with respect to FIG. 2 attached to a metal clutch part;

FIG. 4 shows fiber material of an outer layer of the friction material being burnt off.

DETAILED DESCRIPTION

Figure 5:
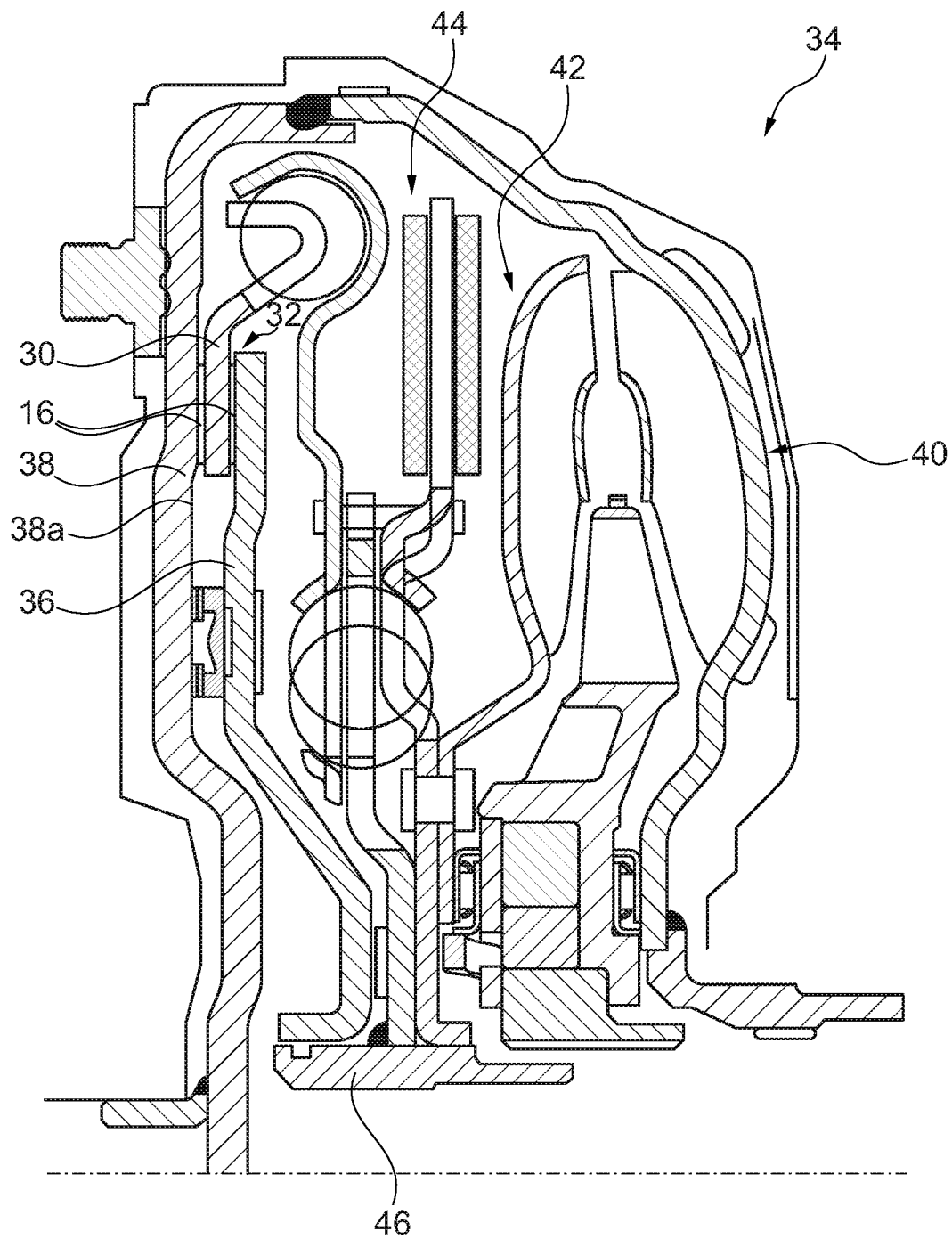
FIG. 5 shows a lockup clutch assembly of a torque converter including the wet friction material with no fiber material in the outer layer.

The present disclosure provides embodiments of a method for making wet friction materials using a thin outer layer formed of cellulose fibers and a higher than usual amount of filler particles. Production of this thin outer layer is cost effective. A base layer is formed of synthetic fibers and fillers. For automotive applications, synthetic fibers are durable as they withstand high temperature and high unit loading, but synthetic fibers reduce the friction performance. The thin outer layer is laminated to top of the base layer by impregnating the layers with a binder that creates a permanent and strong bond between the layers. After curing the binder, before or after the laminated friction material is bonded to a metal support part such as a clutch core plate, a high temperature source is applied to the surface of wet friction material and the cellulose fibers are burnt away. After burning away of the cellulose fibers only filler particles remains on top of the base layer.

FIGS. 1 to 4 schematically illustrate a method of forming a wet friction material and a clutch assembly in accordance with an embodiment of the present disclosure. A base wet friction material layer 10 is manufactured separately from or as a single piece with an outer layer 12. FIG. 1 shows base layer 10 and outer layer 12 as separate pieces.

Base layer 10 is a wet friction material formed of fibers, filler material and a binder. The fibers can be aramid fibers, cellulose fibers, carbon fibers and/or fiberglass. Cellulose fibers can be in the form of cotton linter or wood pulp. The fillers can be diatomaceous earth and/or clay. In one preferred embodiment, the fillers can consist of diatomaceous earth particles having a mean diameter of 3 to 30 micrometers. The binder can be a phenolic resin, a latex or a silane. Optionally a friction modifier such as graphite may also be included in base layer 10.

Outer layer 12 includes cellulose fibers, filler material and a binder. Cellulose fibers can be in the form of cotton linter or wood pulp The fillers can be diatomaceous earth and/or clay. The binder can be a phenolic resin, a latex or a silane. Optionally a friction modifier such as graphite may also be included in outer layer 12.

The composition of outer layer 12 includes a higher ratio of filler material and a lower ratio of fibers than base layer 10, such that outer layer 12 is less porous and more dense than base layer 10, has a higher coefficient of friction than base layer 10 and a higher wear resistance than base layer 10. The fibers of layers 10 and 12 have a mean diameter of 20 to 35 microns and a mean length of 1 to 2 millimeters.

In one preferred embodiment, base layer 10 includes, by percentage weight, 35 to 60% fibers, 15 to 40% filler material and 20 to 30% binder. In another preferred embodiment, base layer 10 includes, by percentage weight, 35 to 55% fibers, 15 to 40% filler material and 20 to 30% binder. More specifically, in one preferred embodiment, base layer includes, by percentage weight, 35 to 60% synthetic fibers, such as aramid fibers, 15 to 40% filler material and 20 to 30% binder. In another preferred embodiment, base layer includes, by percentage weight, 35 to 55% synthetic fibers, such as aramid fibers, 15 to 40% filler material and 20 to 30% binder. In one preferred embodiment, all of the fibers of base layer 10 are aramid fibers and no cellulose, carbon fibers or fiberglass are included in base layer 10.

In some preferred embodiments, outer layer 12 includes, by percentage weight, 5 to 25% cellulose fibers, 45 to 75% filler material and 20 to 30% binder.

FIG. 2 shows the two separate layers 10, 12 being joined together via lamination. The lamination includes pressing outer layer 12 against base layer 10 with a heat plate 14 to cure the binder in at least one of layers 10, 12, fixing outer layer 12 and base layer 10 together. The binder is provided into the pores of a matrix formed by the fibers and the filler material of layers 10, 12. The force of pressing of heat plate 14 against an outer surface 12a of outer layer 12, while a lower surface 12b of outer layer 12 rests on a support surface, causes the binder to accumulate at an interface of an inner surface 12b of outer layer 12 and an outer surface 10a of base layer 10, while the curing of the binder by the heat of heat plate 14 creates a permanent connection between base layer 10 and outer layer 12 In one preferred embodiment, the heat at a surface 14a of plate 14 that contacts outer surface 12a of outer layer is 375 to 425 degrees F.

FIG. 3 shows a wet friction material 16 formed by the joining of base layer 10 and outer layer 12 as described with respect to FIG. 2. FIG. 3 shows wet friction material 16 bonded to a metal part 18. More specifically, adhesive is applied to lower surface 10b of base layer 10 or to a surface 18a of metal part 18 and wet friction material 16 is bonded to metal part 18 with surface 12a, with outer surface 12a of outer layer 12 facing away from metal part 18.

After the forming of wet friction material 16, before or after wet friction material 16 is fixed to metal part 18, wet friction material 16 is heated such that cellulose fibers of wet friction material 16 are burned away. The cellulose fibers may be burned away by exposing wet friction material 16 to a temperature of between 850 to 950 degrees F. The burning away of the cellulose fibers from outer layer 12 leaves a modified outer layer 12' formed of filler material 20, as shown in FIG. 4. The filler material 20 defines a plurality of meandering pores passing through the modified outer layer 12'. Residue from the burnt cellulose fibers is present in the modified outer layer 12' in the form of activated carbon. The activated carbon is beneficial for friction purposes because activated carbon has a high surface energy, causing the activated carbon to adsorb friction modifiers, for example fatty acids or fatty amides that are additives in the automatic transmission fluid, during use that are present in automatic transmission fluid.

Wet friction material 16 is formed such that modified outer layer 12' has a thickness T2 between outer surface 12a' and inner surface 12b', base layer 10 has a thickness T1 between outer surface 10a and lower surface 10b, and wet friction material 16 has a total thickness T3 between outer surface 12a' and lower surface 10b. In one preferred embodiment, the thickness T2 of outer layer 12' is equal 10 to 30% of the total thickness T3, with thickness T1 of base layer 10 thus being 70 to 90% of the total thickness T3.

In one preferred embodiment, as shown in FIG. 3, a hot plate 22 of a hot plate press heated to a temperature of between 850 to 950 degrees F. is applied to outer surface 12a of outer layer 12 to burn the cellulose fibers out of outer layer 12 to form modified outer layer 12'. In another embodiment, wet friction material 16 may be passed through a furnace having a temperature of between 850 to 950 degrees F. to burn off the cellulose fibers such that the cellulose fibers are burnt off by an open flame.

FIG. 5 shows wet friction material 16 bonded to both sides of a metal part in the form of a clutch plate 30 of lockup clutch assembly 32 of a torque converter 34. A piston 36 of lockup clutch assembly 32 forces clutch plate 30 against an inside surface 38a of a front cover 38 of torque converter 34. Piston 36 contacts the modified outer surface 12a' of the rear piece of wet friction material 16 to force the surface 12a' (FIG. 4) on the front piece of wet friction material 16 against inside surface 38a of front cover 38. The forcing of clutch plate 30 against front cover 38 by piston 36 locks the lockup clutch assembly 32 such that a torque path in torque converter 34 to a transmission input shaft bypasses an impeller 40 and a turbine 42 of torque converter 34, and instead flows from front cover 38 to clutch plate 30 and through a damper assembly 44 to a transmission input shaft that is connected to an output hub 46 of torque converter 34.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 base layer
10a outer surface
10b lower surface
12 outer layer
12a outer surface
12b inner surface
12' modified outer layer
12a' modified outer surface
12b' modified inner surface
14 heat plate 14a plate surface
16 wet friction material
18 metal part
20 filler material
22 hot plate
30 clutch plate
32 lockup clutch assembly
34 torque converter
36 piston
38 front cover
38a inside surface
40 impeller
42 turbine
44 damper assembly
46 output hub

What is claimed is:

1. A method of making a wet friction material comprising:
providing an outer layer on a base layer to form the wet friction material, the base layer including a first proportion of fiber material and a first proportion of filler material, the outer layer including a second proportion of fiber material and a second proportion of filler material, the second proportion of fiber material being less than the first proportion of fiber material, the second proportion of filler material being greater than the first proportion of filler material, the second proportion of filler material being 45 to 75% weight of the outer layer; and
forming a modified outer layer by burning off the fiber material of the outer layer.

2. The method as recited in claim 1 wherein the base layer has a first thickness and the modified outer layer has a second thickness, the wet friction material having a total thickness equaling the first thickness plus the second thickness, the second thickness being 10% to 30% of the total thickness.

3. The method as recited in claim 1 wherein the fiber material of the base layer consists of synthetic fiber material.

4. The method as recited in claim 1 wherein the fiber material of the outer layer consists of cellulose fiber material.

5. The method as recited in claim 1 wherein the first proportion of filler material and the second proportion of filler material are each formed by one or more fillers from a group consisting of diatomaceous earth and/or clay.

6. The method as recited in claim 1 wherein the first proportion of fiber material is between 35 to 60% by percentage weight of the base layer and the second proportion of fiber material is between of 5 to 25% by percentage weight of the outer layer.

7. The method as recited in claim 1 wherein the forming of the modified outer layer includes exposing the outer layer to a temperature of from 850 to 950 degrees F.

8. The method as recited in claim 1 wherein the forming of the modified outer layer includes applying a hot plate to an outer surface of the outer layer.

9. The method as recited in claim 1 wherein the providing of the outer layer on the base layer to form the wet friction material includes laminating the outer layer on the base layer.

10. The method as recited in claim 9 wherein at least one of the base layer and the outer layer includes a binder and the laminating of the outer layer on the base layer includes applying heat and pressure to the outer layer to fix the outer layer and the base layer together via the binder.

11. The method as recited in claim 1 wherein the burning off the fiber material creates activated carbon in the outer layer.

12. A method of making a part of a friction clutch comprising:
making the wet friction material with the method as recited in claim 1; and
fixing the wet friction material to a metal part.

13. A wet friction material comprising: a base layer; and an outer layer on the base layer, the base layer including a fiber material and a first filler material, the outer layer including a second filler material and burnt cellulose fibers including activated carbon, the outer layer including pores passing through the outer layer, a proportion of the second filler material being 45 to 75% weight of the outer layer.

14. The wet friction material as recited in claim 13 wherein the fiber material consists of synthetic fiber material.

15. The wet friction material as recited in claim 14 wherein the synthetic fibers are aramid fibers.

16. The wet friction material as recited in claim 13 wherein the base layer has a first thickness and the outer layer has a second thickness, the wet friction material having a total thickness equaling the first thickness plus the second thickness, the second thickness being 10% to 30% of the total thickness.

17. The wet friction material as recited in claim 13 wherein the outer layer includes a matrix of the second filler material defining a plurality of meandering pores passing through the outer layer.

18. The wet friction material as recited in claim 13 wherein the second filler material is from a group consisting of diatomaceous earth and/or clay.

19. The wet friction material as recited in claim 14 wherein a proportion of the fiber is between 35 to 60% by percentage weight of the base layer.

20. A clutch assembly comprising:
a metal part; and
the wet friction material as recited in claim 13 fixed on the metal part.

* * * * *